(12) United States Patent
Greenhalgh et al.

(10) Patent No.: US 11,074,080 B2
(45) Date of Patent: Jul. 27, 2021

(54) APPARATUS AND BRANCH PREDICTION CIRCUITRY HAVING FIRST AND SECOND BRANCH PREDICTION SCHEMES, AND METHOD

(71) Applicant: ARM Limited, Cambridge (GB)

(72) Inventors: Peter Richard Greenhalgh, Cambridge (GB); Simon John Craske, Cambridge (GB); Ian Michael Caulfield, Cambridge (GB); Max John Batley, Cottenham (GB); Allan John Skillman, Kettering (GB); Antony John Penton, Little Canfield (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 16/864,223

(22) Filed: May 1, 2020

(65) Prior Publication Data

US 2020/0257531 A1    Aug. 13, 2020

Related U.S. Application Data

(62) Division of application No. 15/097,377, filed on Apr. 13, 2016, now abandoned.

(30) Foreign Application Priority Data

Jun. 5, 2015   (GB) .................................... 1509736

(51) Int. Cl.
*G06F 9/38* (2018.01)
*G06F 9/30* (2018.01)

(52) U.S. Cl.
CPC .......... *G06F 9/3842* (2013.01); *G06F 9/3016* (2013.01); *G06F 9/30058* (2013.01);
(Continued)

(58) Field of Classification Search
CPC ............................. G06F 9/3842; G06F 9/3867
See application file for complete search history.

(56) References Cited

U.S. PATENT DOCUMENTS

| | | | |
|---|---|---|---|
| 5,872,951 A | 2/1999 | Tran | |
| 5,944,817 A * | 8/1999 | Hoyt | .................. G06F 9/30054 712/233 |

(Continued)

FOREIGN PATENT DOCUMENTS

| | | |
|---|---|---|
| WO | WO 03/052593 | 6/2003 |
| WO | WO 2006/094196 | 9/2006 |
| WO | WO 2012/036918 | 3/2012 |

OTHER PUBLICATIONS

Ben Lee, Dynamic Branch Prediction, 2010, 36 pages, [retrieved from the internet on Jun. 2, 2020], retrieved from URL <web.engr.oregonstate.edu/~benl/Projects/branch_pred/> (Year: 2010).*

(Continued)

*Primary Examiner* — Jyoti Mehta
(74) *Attorney, Agent, or Firm* — Nixon & Vanderhye P.C.

(57) ABSTRACT

A processing pipeline may have first and second execution circuits having different performance or energy consumption characteristics. Instruction supply circuitry may support different instruction supply schemes with different energy consumption or performance characteristics. This can allow a further trade-off between performance and energy efficiency. Architectural state storage can be shared between the execute units to reduce the overhead of switching between the units. In a parallel execution mode, groups of instructions can be executed on both execute units in parallel.

9 Claims, 7 Drawing Sheets

(52) U.S. Cl.
CPC ...... *G06F 9/30083* (2013.01); *G06F 9/30101* (2013.01); *G06F 9/382* (2013.01); *G06F 9/3836* (2013.01); *G06F 9/3867* (2013.01)

(56) References Cited

U.S. PATENT DOCUMENTS

| | | | |
|---|---|---|---|
| 6,317,840 | B1 | 11/2001 | Dean et al. |
| 6,691,222 | B2 | 2/2004 | Janik |
| 2003/0154450 | A1 | 8/2003 | Naffziger |
| 2004/0003309 | A1 | 1/2004 | Cai et al. |
| 2004/0098718 | A1 | 5/2004 | Yoshii et al. |
| 2007/0050672 | A1 | 3/2007 | Mangione-Smith |
| 2008/0270767 | A1 | 10/2008 | Sonobe et al. |
| 2009/0164812 | A1 | 6/2009 | Capps, Jr. et al. |
| 2010/0242014 | A1 | 9/2010 | Zhu |
| 2010/0325395 | A1 | 12/2010 | Burger |
| 2011/0161586 | A1 | 6/2011 | Potkonjak et al. |
| 2011/0271126 | A1 | 11/2011 | Hill |
| 2013/0007494 | A1 | 1/2013 | Branover et al. |
| 2015/0067214 | A1 | 3/2015 | Henry et al. |
| 2016/0357561 | A1 | 12/2016 | Greenhalgh et al. |

OTHER PUBLICATIONS

Onur Mutlu, Lecture 9: Branch Prediction I, Feb. 4, 2015, 65 pages, [retrieved from the internet on Jun. 8, 2020], retrieved from URL <www.archive.ece.cmu.edu/~ece447/s15/lib/exe/fetch.php?media=onur-447-spring15-lecture9-branch-prediction-afterlecture.pdf> (Year: 2015).*

Marius Evers, Improving branch prediction by understanding branch behavior, 2000, 163 pages, retrieved from the internet on Mar. 222, 2021, retrieved from URL <https://www.eecs.umich.edu/techreports/cse/99/CSE-TR-417-99.pdf> (Year: 2000).*

Office Action dated Jun. 29, 2018 for U.S. Appl. No. 15/097,377, 13 pages.

Final Office Action dated Dec. 14, 2018 for U.S. Appl. No. 15/097,377, 13 pages.

Office Action dated Jan. 2, 2020 for U.S. Appl. No. 15/097,377, 14 pages.

Combined Search and Examination Report for GB1509736.3 dated Nov. 30, 2015, 7 pages.

Search Report for GB 1509736.3 (claims 23-28) dated Feb. 29, 2016, 3 pages.

Search Report for GB 1509736.3 (claims 29-35) dated Feb. 29, 2016, 3 pages.

A. Lukefahr et al., "Composite Cores: Pushing Heterogeneity into a Core", MICRO-45 Proceedings of the 2012 45th Annual IEEE/ACM International Symposium on Microarchitecture, Dec. 1, 2012, pp. 317-328.

S. Padmanabha et al., "Trace Based Phase Prediction for Tightly-Coupled Heterogeneous Cores", MICRO-46 Proceedings of the 46th Annual IEEE/ACM International Symposium on Microarchitecture, Dec. 7, 2013, pp. 445-456.

Examination Report for GB Application No. 1509736.3 dated Dec. 6, 2019, 5 pages.

* cited by examiner

| | mode | predecode 24 | fetch 6 | branch prediction 30 | decode 8 | execute |
|---|---|---|---|---|---|---|
| A | highest performance | more/less predecode info generated | greater fetch width | earlier prediction/ more branch history data | more instructions decoded per cycle | execute 0 (40) |
| B | higher performance, lower branch prediction overhead | more/less predecode info generated | greater fetch width | later prediction/ less branch history data | more instructions decoded per cycle | execute 0 (40) |
| C | higher energy efficiency, higher branch prediction accuracy | less/more predecode info generated | smaller fetch width | earlier prediction/ more branch history data | fewer instructions decoded per cycle | execute 1 (42) |
| D | higher energy efficiency | less/more predecode info generated | smaller fetch width | later prediction/ less branch prediction data | fewer instructions decoded per cycle | execute 1 (42) |

FIG. 6

APPARATUS AND BRANCH PREDICTION CIRCUITRY HAVING FIRST AND SECOND BRANCH PREDICTION SCHEMES, AND METHOD

CROSS-REFERENCE

This application is a divisional of U.S. application Ser. No. 15/097,377, filed Apr. 13, 2016, which claims priority to GB Patent Application No. 1509736.3 filed 5 Jun. 2015, the entire contents of each of which are hereby incorporated by reference.

TECHNICAL FIELD

The present technique relates to the field of data processing.

TECHNICAL BACKGROUND

When providing execution circuitry in a processing pipeline, there may be a trade-off between processing performance and energy consumption. Some execution circuitry may be provided with resources for enabling higher performance, but this may incur a greater energy cost than a simpler design providing lower performance.

SUMMARY

At least some examples provide an apparatus comprising:
a processing pipeline comprising:
first and second execution circuitry to execute instructions, wherein the first and second execution circuitry have different performance or energy consumption characteristics; and
instruction supply circuitry to supply instructions to the first and second execution circuitry, wherein the instruction supply circuitry supports first and second instruction supply schemes with different performance or energy consumption characteristics.

At least some examples provide an apparatus comprising:
means for pipelined processing of instructions, comprising:
first and second means for executing instructions, wherein the first and second means for executing have different performance or energy consumption characteristics; and
means for supplying instructions to the first and second execution circuitry, wherein the means for supplying supports first and second instruction supply schemes with different performance or energy consumption characteristics.

At least some examples provide a method comprising:
selecting one of first and second execution circuitry of a processing pipeline for executing a group of instructions, the first and second execution circuitry having different performance or energy consumption characteristics; and
selecting one of first and second instruction supply schemes for supplying instructions to be processed by the selected one of the first and second execution circuitry, wherein the first and second instruction supply schemes have different performance or energy consumption characteristics.

At least some examples provide an apparatus comprising:
a processing pipeline comprising first and second execution circuitry to execute instructions, wherein for at least one group of instructions, both the first and second execution circuitry are capable of executing said at least one group of instructions, and the first and second execution circuitry have different performance or energy consumption characteristics when executing said at least one group of instructions; and
shared architectural state storage circuitry accessible to both the first execution circuitry and the second execution circuitry;
wherein the shared architectural state storage circuitry comprises a plurality of a registers to store operands for processing by the first and second execution circuitry.

At least some examples provide an apparatus comprising:
means for pipelined processing of instructions, comprising first and second means for executing instructions, wherein for at least one group of instructions, both the first and second means for executing are capable of executing said at least one group of instructions, and the first and second means for executing have different performance or energy consumption characteristics when executing said at least one group of instructions; and
means for storing shared architectural state accessible to both the first execution circuitry and the second execution circuitry;
wherein the means for storing comprises a plurality of register means for storing operands for processing by the first and second means for executing.

At least some examples provide a method comprising:
processing instructions with a processing pipeline comprising first and second execution circuitry, wherein for at least one group of instructions, both the first and second execution circuitry are capable of executing said at least one group of instructions, and the first and second execution circuitry have different performance or energy consumption characteristics when executing said at least one group of instructions; and
accessing shared architectural state storage circuitry accessible to both the first execution circuitry and the second execution circuitry;
wherein the shared architectural state storage circuitry comprises a plurality of a registers to store operands for processing by the first and second execution circuitry.

At least some examples provide an apparatus comprising:
a processing pipeline comprising first and second execution circuitry to execute instructions, wherein for at least one group of instructions, both the first and second execution circuitry are capable of executing said at least one group of instructions, and the first and second execution circuitry have different performance or energy consumption characteristics when executing said at least one group of instructions; and
control circuitry to classify groups of instructions as first groups of instructions to be executed on the first execution circuitry or second groups of instructions to be executed on the second execution circuitry;
wherein the processing pipeline supports execution of at least one of said first groups of instructions on the first execution circuitry in parallel with execution of at least one of said second groups of instructions on the second execution circuitry.

At least some examples provide an apparatus comprising:
means for pipelined processing of instructions, comprising first and second means for executing instructions, wherein for at least one group of instructions, both the first and second means for executing are capable of executing said at least one group of instructions, and the first and second means for executing have different performance or energy consumption characteristics when executing said at least one group of instructions; and means for classifying groups of instructions as first groups to be executed on the first means for executing or second groups to be executed on the second means for executing;

wherein the means for pipelined processing supports execution of at least one of said first groups of instructions on the first means for executing in parallel with execution of at least one of said second groups of instructions on the second means for executing.

At least some examples provide a method comprising:

classifying groups of instructions as first groups to be executed on first execution circuitry of a processing pipeline and second groups to be executed on second execution circuitry of the processing pipeline, wherein for at least one group of instructions, both the first and second execution circuitry are capable of executing said at least one group of instructions, and the first and second execution circuitry have different performance or energy consumption characteristics when executing said at least one group of instructions; and executing at least one of said first groups of instructions on the first execution circuitry in parallel with executing at least one of said second groups of instructions on the second execution circuitry.

The above, and other objects, features and advantages will be apparent from the following detailed description of illustrative embodiments which is to be read in connection with the accompanying drawings.

BRIEF DESCRIPTION OF THE DRAWINGS

Further aspects, features and advantages of the present technique will be apparent from the following description of examples, which is to be read in conjunction with the accompanying drawings, in which:

FIG. 6 is a table showing a number of instruction supply schemes comprising example combinations of the predecode, fetch, branch prediction and decode schemes;

DESCRIPTION OF EXAMPLES

Figure 1:
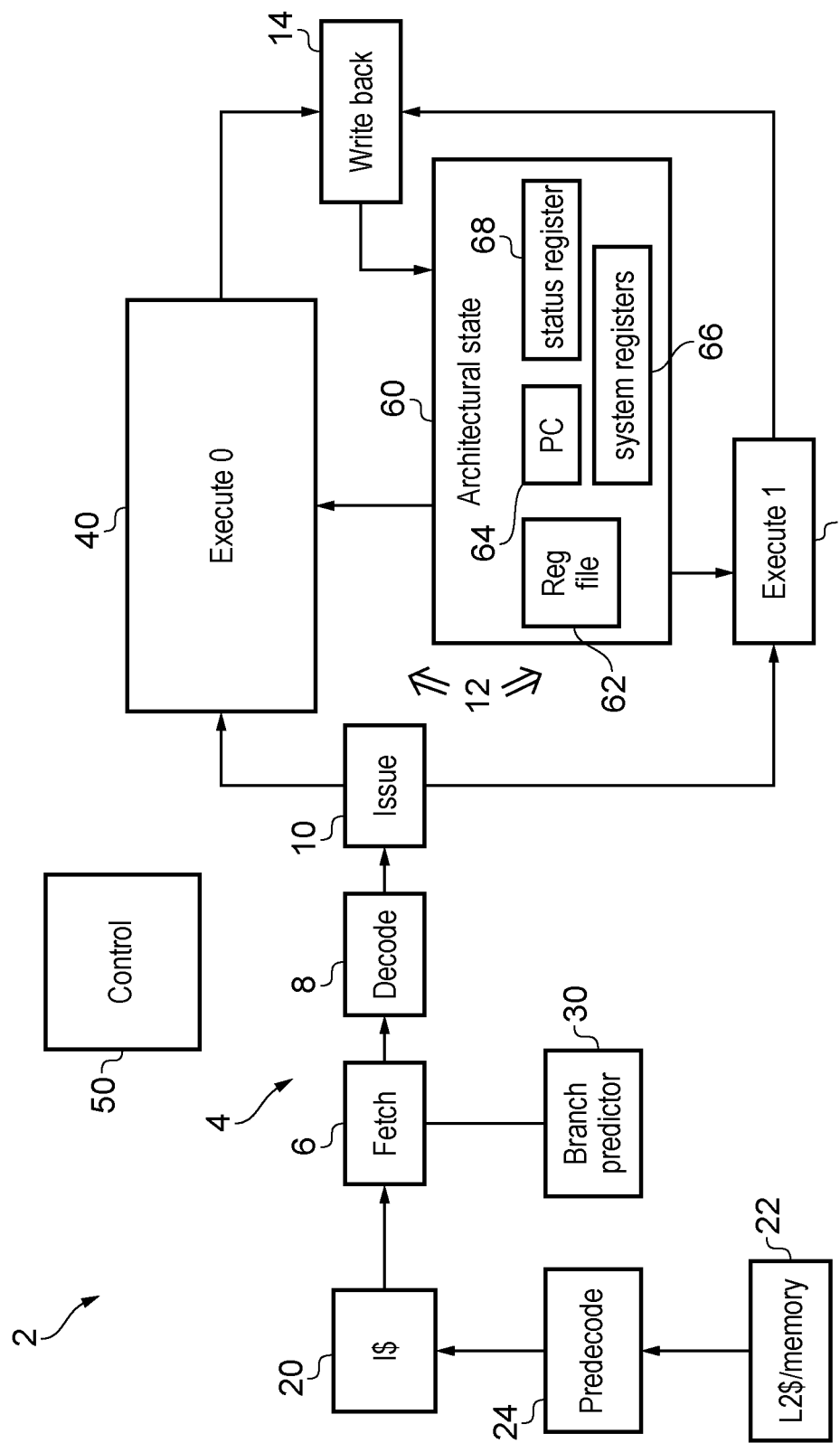
FIG. 1 schematically illustrates an example of an apparatus comprising a processing pipeline having first and second execution circuitry with different performance or energy consumption characteristics.

Some examples of the present technique are discussed below.

A processing pipeline may comprise first and second execution circuitry to execute instructions, where the first and second execution circuitry have different performance or energy consumption characteristics. This enables different execution circuitry within the same pipeline to be selected depending on whether a particular task to be executed is expected to achieve higher performance or whether a more energy efficient but lower performance execution circuit would be sufficient. For example, some tasks may experience a larger difference in performance depending on which execution circuit is used, and so the higher performance execution circuit could be selected for such tasks, while for other tasks there may be a smaller difference in performance because they are not well suited to the particular performance enhancements provided in the higher performance execution circuit, and in this case a more energy efficient execution circuit could be selected. Hence, in general there may be a number of execution circuits which may each be capable of executing a given set of instructions, but with different performance or energy consumption characteristics. For example, one of the execution circuits may have a greater maximum throughput of instructions than the other, but may also tend to consume more power than the other execution circuit.

The inventors recognised that the execution circuitry itself may not be the only point of the pipeline at which there can be a trade-off between performance and energy consumption. Instruction supply circuitry which supplies instructions to the first or second execution circuitry may also impact on performance or energy consumption. The instruction supply circuitry may support first and second instruction supply schemes with different performance or energy consumption characteristics. This provides further scope for increased performance or energy savings, depending on the nature of the instructions being executed. The different instruction supply schemes may complement the performance versus energy trade-off in the execution circuitry itself to provide an overall processing pipeline which provides a better balance between performance and energy consumption.

In a similar way to the first and second execution circuitry, the first and second instruction supply schemes may differ in terms of their performance and energy. For example, the first instruction supply scheme may be such that it provides a greater maximum throughput of instructions (e.g. a greater number of instructions supplied per unit time or per processing cycle) than the second instruction supply scheme. On the other hand, the instruction supply circuitry may consume less energy when using the second instruction supply scheme than when using the first instruction supply scheme. Hence the first or second instruction supply scheme can be selected depending on whether performance or energy efficiency is preferred for a given set of instructions.

There are a number of ways in which the instruction supply schemes may differ. The instruction supply circuitry may comprise one or more stages or units for performing various tasks relating to the supply of instructions to the first and second execution circuitry, and any one or more of these stages or units may have different schemes available with different levels of performance or energy consumption.

For example the instruction supply circuitry may include fetch circuitry for fetching instructions from an instruction store (such as instruction cache or memory). The fetch circuitry may support first and second fetch schemes with different performance or energy consumption characteristics. For example, in the first fetch scheme the first circuitry may fetch a wider block of instructions per cycle than in the second fetch scheme. Fetching a wider block of instructions per cycle may improve performance by increasing throughput of instructions, but may cost more energy both within the fetch circuitry itself and in the instruction store. By providing the ability to select between the different fetch schemes, this allows higher performance to be achieved when required, but lower energy consumption when the increased performance is not needed.

Also, the instruction supply circuitry may comprise predecode circuitry for predecoding instructions prior to instructions being stored in an instruction store such as an instruction cache. The predecode circuitry may support first and second precoding schemes with different performance or energy consumption characteristics. For example, in the first predecoding scheme the predecode circuitry may generate different information for a predecoded instruction than in the second predecoding scheme. For example, the different predecoding schemes could generate different amounts of information, different types of information, or one of the predecoding schemes may not generate any predecode information at all so that instructions may be placed in the instruction store without any predecoding being carried out. The predecode circuitry can help to boost performance because the predecode circuitry can at least partially decode the instruction and generate some information which is stored alongside the instruction in the instruction store so that on each fetch of the instruction from the instruction store it is not necessary to repeat this decoding operation in a subsequent decode stage. If the same instruction from the instruction store is fetched a number of times then the additional information indicated by the predecode circuitry can save both processing time and energy consumption at the decode stage since the overhead of predecoding is incurred once when the instruction is placed in the instruction store and amortized across multiple fetches of the same instruction from the instruction store. On the other hand, for other tasks, it may be less likely that a particular instruction will be fetched multiple times from the instruction store, and in this case, it may be more efficient to perform less predecoding or even no predecoding at all. Hence, by supporting different predecoding schemes which can generate different information for a predecoded instruction, this can provide a further opportunity to trade off performance against power consumption.

In another example, the instruction supply circuitry may comprise decode circuitry for decoding instructions to be executed by the first and second execution circuitry. The decode circuitry may support first and second decode schemes with different performance or energy consumption characteristics. For example in the first decode scheme the decode circuitry may decode a greater number of instructions per cycle than in the second decode scheme. This may allow the first decode scheme to be selected for greater performance and the second decode scheme to be selected to provide greater energy efficiency.

Also, the instruction supply circuitry may comprise branch prediction circuitry for predicting an outcome of branch instructions. The branch prediction circuitry may support first and second branch prediction schemes with different performance or energy consumption characteristics. There could be different ways of distinguishing the branch prediction schemes.

For example, the first branch prediction scheme may initiate a branch prediction at an earlier stage of a processing pipeline than the second branch prediction scheme. While performing a branch prediction earlier may improve performance because it allows other instructions to be fetched according to the predicted outcome of the branch prediction sooner, this may result in increased energy consumption because at the earlier stage of the pipeline there may be less information available about the instruction for which the branch prediction is made and so this could increase the likelihood that branch predictions are made unnecessarily or incorrectly. For example, in one example the first branch prediction scheme may initiate branch predictions before a particular instruction has been identified as a branch instruction, while in the second branch prediction scheme the branch prediction could be initiated once a selected instruction has actually been identified as a branch instruction. With the first scheme performance may be improved because the results of the branch prediction will be available earlier and this can result in other instructions being fetched with lower latency, which can improve the overall throughput of instructions. However, with the second branch prediction scheme energy efficiency may be improved because branch predictions are only initiated for branch instructions, to reduce the overhead in looking up branch history data or other information used to make the branch prediction.

Another way in which the first and second branch prediction schemes may differ may be that they use different sets of prediction data. For example the first branch prediction scheme may use a greater amount of prediction data than the second prediction scheme. The amount of prediction data may depend on a number of factors, such as the number of past branches for which outcomes are recorded in the prediction data, or the number of bits used to track confidence in a particular branch outcome. While a larger set of prediction data may increase the likelihood of the branch prediction being correct and hence increase the expected throughput of instructions, looking up and updating the larger set of prediction data may increase energy consumption. By also providing a second branch prediction scheme which uses less prediction data, energy consumption can be reduced when desired.

When different sets of prediction data are provided for the first and second branch prediction schemes, then one option may be to only update the prediction data for the branch prediction scheme which is currently being used. In this case, while using the second branch prediction scheme, the first set of prediction data would not be updated, and vice versa. However, in this case when switching branch prediction schemes, there may be a period following the switch when the prediction data of the new scheme is out of date and there may be a performance impact because branch mispredictions are more likely while waiting for the prediction data to be warmed up. This may not be such a problem when switching from the scheme with greater performance to the scheme with greater energy efficiency, as it would be expected that performance may be reduced. However, when switching in the other direction the performance impact caused by out of date prediction data could limit the performance benefits of switching to the higher performance branch prediction scheme in the first place. Therefore, at least when using the second branch prediction scheme which provides greater energy efficiency, then the prediction data used by the first branch prediction scheme can continue to be updated in response to resolved branches. The additional energy cost of continuing to update the first set of prediction data while using the second branch prediction scheme may be relatively low because the data only needs to be updated in response to resolved branches, but the performance improvement by doing this additional updating of the prediction data may be significant because at the point of switching back to the first branch prediction scheme the corresponding set of prediction data may already be warm as if the first branch prediction scheme had never been turned off.

In summary, the instruction supply circuitry may include a number of units which may have different schemes available for balancing energy consumption and performance. These may include the fetch stage, decode stage, branch predictor and predecode circuitry as discussed above. The different instruction supply schemes mentioned above may correspond to any combination of the different fetch, decode, predecode, and branch prediction schemes mentioned above. While the examples above describe two different fetch schemes, decode schemes, predecode schemes, or branch prediction schemes, it will be appreciated that three or more schemes could be provided, with the "first" and "second" schemes discussed above corresponding to any two of these schemes. Similarly, three or more instruction supply schemes could be formed using different combinations of the fetch, predecode, decode or branch prediction schemes.

In general, the apparatus may have some control circuitry which selects for a given set of instructions whether the instruction supply circuitry should supply the set of instructions to the first execution circuitry or to the second execution circuitry, and the control circuitry may also determine whether the instruction supply circuitry should use the first or second instruction supply scheme. In some cases the control circuitry could be a dedicated piece of hardware provided for selecting the instruction supply scheme and the execution circuit to use. In other examples the control circuitry could be the processing pipeline itself, with some of the instructions executed by the pipeline providing the functionality to select how the pipeline processes later instructions.

In one example the control circuitry could be responsive to annotations provided with sets of instructions to indicate which instruction supply scheme or which execution circuit to use for those instructions. In other examples the control circuitry may monitor a performance metric when executing instructions using the first execution circuitry or the second execution circuitry and use the performance metric to determine which execution circuitry and which instruction supply scheme to use. For example a thread which does not exhibit high performance even when executed on the higher performance execution circuitry could be switched to the lower performance execution circuitry to improve energy efficiency.

In some cases, the selection of the instruction supply scheme could be tied directly to which execution circuit is being used. For example, there could be a higher performance mode comprising use of the first execution circuitry and the first instruction supply scheme and a more energy efficient mode comprising use of the second execution circuitry and the second instruction supply scheme.

On the other hand, in other embodiments the selection of the instruction supply scheme could be independent of which execution circuitry is used, or the scheme used in at least one of the individual components of the instruction supply circuitry (such as the fetch stage, decode stage, branch predictor, or predecode circuitry as mentioned above) could be selected independently of which execution circuitry is used. This may provide scope for finer control of the level of performance/energy consumption achieved, so that a range of different performance/energy points can be selected.

In particular, it may be desirable to allow the branch prediction circuitry to choose either the first or second branch prediction scheme regardless of which execution circuitry is currently being used. For example the control circuitry may permit the first branch prediction scheme to be selected in combination with the second execution circuitry or permit the second branch prediction scheme to be selected in combination with the first execution circuitry. This can be useful because some sequences of instructions may achieve a significant performance benefit on the higher performance first execution circuitry but may exhibit a higher branch misprediction rate (e.g. because the outcomes of branches are highly data dependent for example). In this case, selecting the more energy efficient second branch prediction scheme may be preferable to avoid unnecessarily incurring the additional overhead of the more complex first branch prediction scheme when it would not actually produce a significant performance benefit.

The processing pipeline may be provided with shared architectural state storage circuitry which is accessible to both the first execution circuitry and the second execution circuitry. In particular the shared architectural state storage circuitry may comprise a number of registers for storing operands for processing by the first and second execution circuitry.

In previous systems two separate processor cores have been provided with one core generally providing higher performance and the other being more energy efficient. However providing separate cores can make it more difficult to switch processing between the cores because each core may have separate architectural state including registers which would need to be saved and restored when execution is transferred between the cores. This approach can be slow, may require explicit software intervention in order to transfer processing and therefore may be prone to mistakes in the switching software. By providing first and second execution circuitry within a single processing pipeline and shared architectural state storage circuitry including registers which are accessible to both the first and second execution circuitry, this reduces the need for state to be saved and restored in software, and therefore reduces the latency and energy overhead associated with switching processing between the execution circuits.

By reducing the overhead of switching between the execution circuits, this has the knock on effect that greater performance gains or energy savings are possible during the regular processing of instructions (not just during the switch events). With the previous approach of providing entirely separate cores, the overhead of switching cores would only be justified if following the switch the processing would continue on the other core for sufficient time that the overall performance improvement or improvement in energy efficiency outweighs the cost associated with the switch itself. This limits the frequency with which execution can be switched between the two cores, and so a relatively long sequence of instructions would need to remain on the same core. In practice, even if the long sequence of instructions would generally be preferred for execution on the higher performance or higher energy efficiency core, there may be shorter sequences within this sequence for which the other core is preferred, and continuing to execute these shorter sequences on the 'wrong' core can unnecessarily increase power consumption or harm performance. By providing first and second execution circuitry within a pipeline and sharing architectural state including registers to reduce the overhead of switching, it becomes feasible to temporarily switch these shorter sequences to the other core to increase the performance gains and/or energy savings which can be achieved.

In addition to the registers the shared architectural state may also include other information, for example status registers providing status information about the status of the execution circuitry, such a program counter which indicates a next instruction to be executed, or condition codes for indicating the current condition of the execution circuitry which can be used for determining outcomes of conditional instructions. Also the shared state could include configuration registers which store configuration information for configuring the operation of the first or second execution circuitry, such as system registers defining a current mode of operation for the first or second execution circuitry. It will be appreciated that many other pipeline elements may be shared between the first and second execution circuitry. For example, the shared elements could include an instruction cache, fetch circuitry, decode circuitry, shared registers, writeback circuitry, a data cache, and so on.

In some examples, the processing pipeline may allow instructions to be executed on only one of the first and second execution circuitry at a time, not both in parallel.

However, other examples may support execution of instructions on the first and second execution circuitry in parallel, as well as individually. For example, some examples may have control circuitry for classifying groups of instructions as first groups of instructions to be executed on the first execution circuitry or second groups of instructions to be executed on the second execution circuitry. For example a performance metric may be monitored during execution of instructions on one of the execution circuits, and the metric could be used to determine which execution circuit to use for subsequent execution of those instructions.

Hence, when there is both a first group of instructions and a second group of instructions to be processed, the processing pipeline may allow one of the first group of instructions to be processed on the first execution circuitry in parallel with execution of one of the second groups of instructions on the second execution circuitry. When the first execution circuitry provides higher potential performance and the second execution circuitry provides lower energy consumption, then allowing another group of instructions to execute on the second execution circuitry while also processing a group of instructions on the first execution circuitry can provide a further performance boost by increasing the throughput of instructions, but with less energy cost than if the first execution circuitry itself was expanded to handle additional instructions.

In some systems, parallel execution of instructions on the first and second execution circuitry may always be permitted provided there is at least one group of instructions for which the first execution circuitry is to be selected. However, other examples may have different modes of operating the processing pipeline. For example, the parallel execution on the first and second execution circuitry may be permitted in a first mode, but in a second mode instructions may be executed on one of the first and second execution circuitry at a time. The selection of the first or second processing mode could be based on configuration data set during the manufacture of a device, or based on programmable information which can be set by the processing pipeline in response to instructions provided by the user.

FIG. 1 schematically illustrates an example of a data processing apparatus 2 having a processing pipeline 4 for processing instructions. The pipeline 4 includes a number of stages including a fetch stage 6, a decode stage 8, an issue stage 10, an execute stage 12 and a write back stage 14. It will be appreciated that this is just one example of a possible pipeline design and that other examples may have different combinations of stages. For example a register renaming stage could be provided for mapping architectural registers specified by instructions to physical registers 62 provided in hardware.

The fetch stage 6 fetches instructions from an instruction cache 20. The instruction cache 20 stores a subset of instructions which have been fetched from memory or a further level cache 22. Predecode circuitry 24 is provided for performing predecoding on instructions fetched from the further level cache or memory 22 to the instruction cache 20. The predecode circuitry 24 may at least partially decode the instructions and generate some additional predecoding information which is stored alongside the instruction in the instruction cache 20. For example the predecode information may provide indicate the type of instruction, whether the instruction is undefined, the addressing mode used by the instruction, or some other information which affects processing of the instruction at the later stage of the pipeline 4. By generating predecoding information at the predecode circuitry 24 rather than waiting until the decode stage 8, the overhead associated with determining the predecoding information can be incurred once when the instruction is loaded from the memory 22 or further level cache, rather than being incurred multiple times each time the same instruction stored in the cache 20 is fetched by the fetch stage 6. Since the same instruction may be fetched multiple times the predecode circuitry may provide an overall energy saving or performance improvement.

A branch predictor 30 is provided for predicting outcomes of branch instructions. A branch instruction may cause execution to branch to a memory address which is non-sequential with the current address being processed. Whether a branch is taken may depend on whether a particular condition is satisfied. The branch predictor 30 may predict, before it is actually known whether the condition is satisfied, whether the branch should be taken. The fetch circuit 6 can start fetching instructions following the branch depending on the predicted outcome. This can help to improve performance because when the prediction is correct then instructions following the branch can be fetched, decoded, issued and executed more quickly than if the fetch stage 6 waited for the branch outcome to become known before fetching the subsequent instructions.

The decode stage 8 decodes instructions fetched by the fetch unit 6. The decode stage 8 may interpret the instruction opcode and any other information provided with the instructions fetched by the fetch stage 6 (including any information already generated by the predecode stage 24). The decode stage 8 generates decoded instructions which may include control information for controlling the execution stage to perform corresponding processing operations. For some instructions fetched by the fetch stage 6, the decode stage 8 may map the instruction to several decoded instructions so that the "instructions" seen by later stages of the pipeline may be in a different form to the instructions fetched from the cache 20. For example, a single complex instruction may be broken down into individual micro-operations which each correspond to one step in the processing operation to be performed in response to the complex instruction. Therefore, references to "instructions" in this application should be interpreted as including micro-operations.

The decoded instructions are provided to an issue stage 10 where the instructions await issue to the execute stage 12. For example the instructions may remain in the issue stage 10 until their operands are available.

The execute stage 12 includes a first execution circuit 40 and a second execute circuit 42 with different performance or energy consumption characteristics. In this example the first execution circuit 40 is able to process instructions with a greater maximum throughput of instructions than the second execution circuit 42, but it also has greater energy consumption. For example, the first execution circuit 40 may support out-of-order processing in which instructions may be issued and executed in a different order from the original program order in which they were fetched from the instruction cache 20. This can improve performance since while one instruction is stalled because it is waiting for operands to become available or data to be loaded from a cache or memory, a later instruction in the program order whose operands are available can proceed. However, there may be some overhead in supporting out-of-order execution, such as tracking when each instruction's operands become available and which instructions have completed. The second execution circuit 42 may in some cases support in-order execution of instructions so that instructions can only be executed in their original program order. This may be more energy efficient but may provide a smaller throughput of instructions since a stalled instruction will block later instructions. Alternatively the second execution circuit 42 could also support out-of-order processing, but with a smaller degree of reordering than the first execution circuit. For example the second execution circuit could have a smaller reorder buffer or other structure for tracking the completion of instructions that have executed out of order, so that fewer instructions may be executed ahead of an older instruction. In other examples, the first execution circuit 40 may support a greater maximum throughput of instructions because it has resources for processing a greater number of instructions in parallel than the second execution circuit 42. Alternatively the first execution circuit 40 may have circuit components which support a higher clock frequency than the second execution circuit 42. Hence there are a number of options for providing greater performance with the first execution circuit 40, but greater energy efficiency in the second execution circuit 42.

Control circuitry 50 is provided for selecting which of the first and second execution circuits 40, 42 to use for a given set of instructions. For example, the control circuitry 50 may monitor performance metrics during processing of the instructions on one or both the first and second execution circuits 40, 42 and control the issue stage 10 to issue instructions to one of the execution circuits 40, 42 selected based on the performance metrics. For example, if performance drops below a certain level even when the first execution circuit 40 is used then this may indicate that these instructions may be better suited to executing on the second execution circuitry 42 to reduce power consumption.

The first and second execute circuits 40, 42 share a common architectural state storage circuit 60 which provides shared architectural state which can be accessed by both the first and second execute units 40, 42. For example the architectural state 60 may include a physical register file 62 comprising a number of physical registers for storing operands to be processed by the first or second execute circuits 40, 42 and the results of executed instructions, a shared program counter 64 indicating the next instruction to be fetched, system registers 66 providing information for configuring the operation of the first or second execute unit 40, 42, such as an indication of which mode to operate in, and a status register 68 which may provide information about the current state of the first or second execution circuits 40, 42, such as condition codes which are used to determine the outcome of conditional instructions such as branch instructions. By sharing architectural state 60 between the two execution circuits 40, 42, switching of processing from one execution circuit to the other is more efficient because following the switch the newly selected execution circuit can carry on processing from the point at which the old execution circuit left off without the need for transfer of register state.

The pipeline 4 also includes a write back stage 14 for writing back results of instructions executed by the first or second execute stage 40, 42 to the register file 62 in the shared architectural state 60.

The predecode circuit 24, fetch stage 6, decode stage 8, issue stage 10 may collectively be considered to represent instruction supply circuitry for supplying instructions to the execute circuits 40, 42. The instruction supply circuitry may support different instruction supply schemes providing different levels of performance or energy efficiency. Several examples are discussed below.

Figure 2:
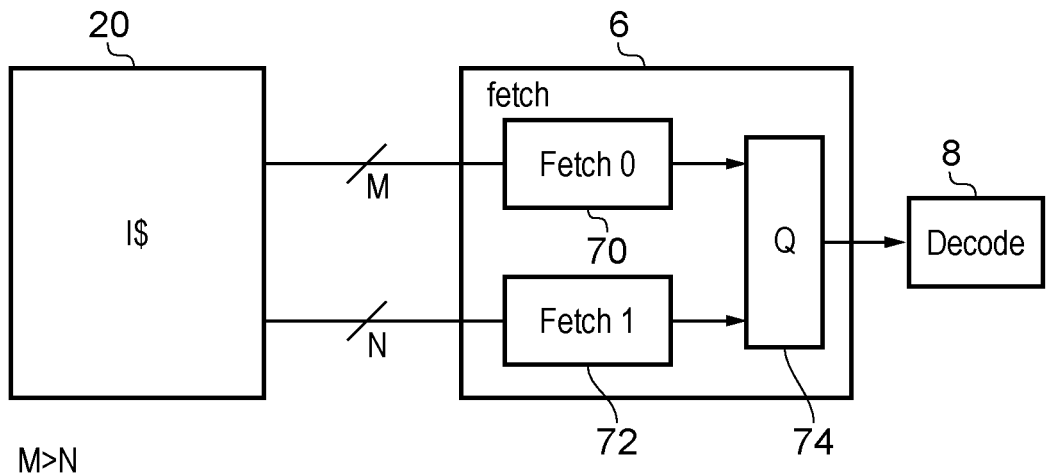
FIG. 2 shows an example of a fetch stage supporting fetch schemes with different performance or energy consumption characteristics.

For example FIG. 2 shows an example of different fetch schemes supported by the fetch stage 6. The fetch stage 6 may have a first fetch circuit 70 which fetches M bits of instruction data from the instruction cache 20 per processing cycle and a second fetch unit 72 which fetches N bits of instruction data per processing cycle, where M>N. Each fetch circuit 70, 72 places the fetched bits of instruction data in a fetch queue 74 and instructions from the fetch queue 74 are passed the decode stage 8 for decoding. By selecting the first fetch unit 70 a greater throughput of instructions is possible to improve the performance of the pipeline. By selecting the second fetch unit 72, energy consumption can be reduced by reducing the overhead consumed when looking up the cache 20 (e.g. reduced tag comparison overhead), reducing dynamic leakage by reducing the number of bits that toggle on signal lines carrying the fetched instructions, and reducing the energy consumed in accessing the fetch queue 74, for example. While FIG. 2 shows an example with two separate fetch circuits 70, 72, in other examples a common fetch circuit could be provided where parts of the fetch circuit could be disabled or placed in a power saving state when the narrower instruction fetch width is selected.

Figure 3:
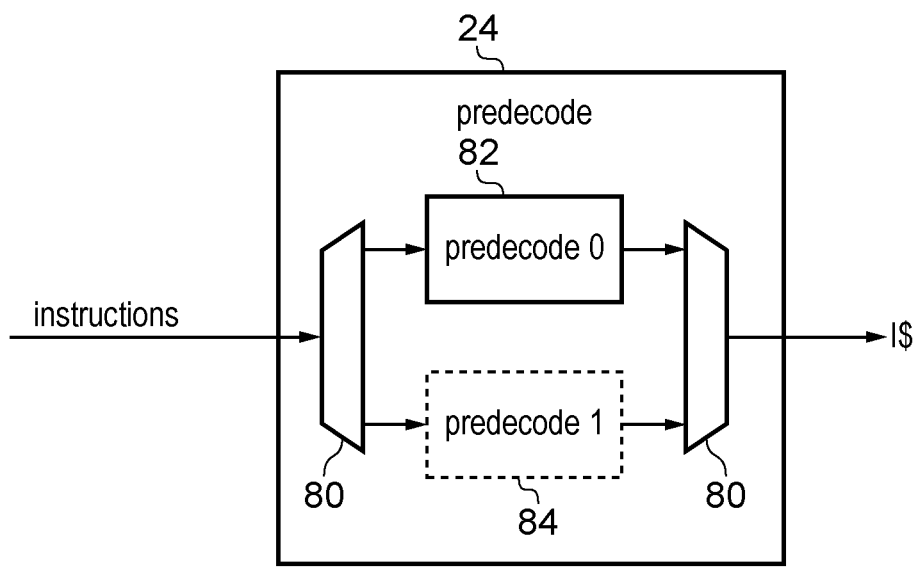
FIG. 3 shows an example of predecode circuitry supporting predecode schemes with different performance or energy consumption characteristics.

FIG. 3 shows an example in which the predecode circuitry 24 supports different predecode schemes which have different energy or performance characteristics. Some multiplexers 80 are provided to select whether instructions from the memory or further cache 22 are passed through a first predecode unit 82 or a second predecode unit 84 before being provided to the instruction cache 20. Each predecode unit 82, 84 may generate different predecoding information, which could correspond to different types or amounts of information. In some examples the second predecode unit 84 may not generate any predecoding information at all so that instructions may simply be passed straight through to the instruction cache 20 without any additional information being generated. Which of the first and second predecode units 82, 84 provides greater performance or reduced energy consumption may depend in practice on the nature of the information being generated at the predecode stage 24 and the type of instructions being executed. On the one hand, the first predecode unit 82 generating more predecode information could provide increased performance as well as greater energy efficiency since by generating this predecode information once at the predecode stage 24 for an instruction stored to the instruction cache 20 rather than multiple times at the decode stage 8 for each fetch of the same instruction from the instruction cache 20, the overhead associated with determining this information can be amortized across multiple fetches. On the other hand, if instructions in the instruction cache 20 are generally fetched relatively few times before being evicted then the first predecode unit 82 could actually increase energy consumption compared to the second predecode unit 84 and it may be more efficient to leave most of the decoding to the decode stage 8. Therefore, which of the first and second predecode circuits 82, 84 is considered the higher performance circuit or the higher energy efficiency circuit may depend on the particular implementation. In general, one of the predecoding schemes can be selected depending on the expected performance or energy efficiency for a given set of instructions.

Figure 4:
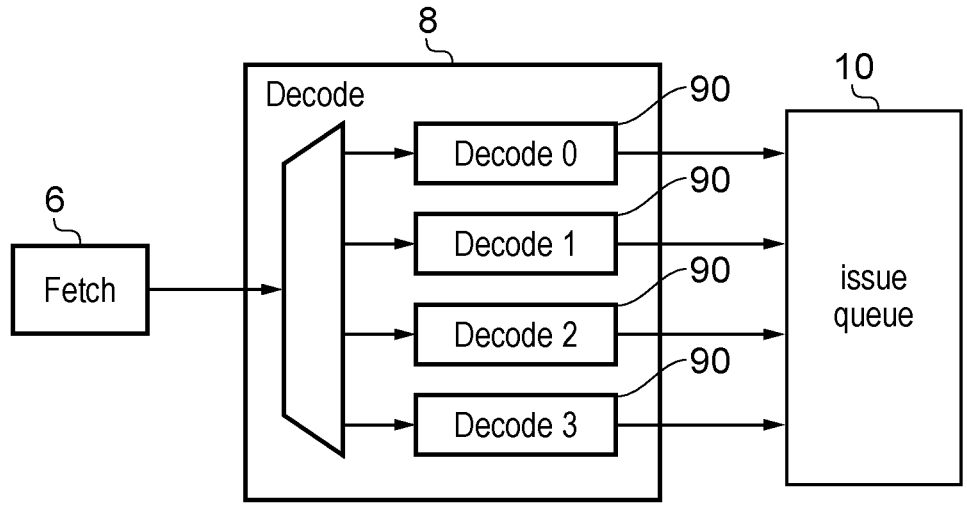
FIG. 4 shows an example of a decode stage supporting decode schemes with different performance or energy consumption characteristics.

FIG. 4 illustrates an example in which the decode stage 8 supports different decode schemes with different levels of performance or energy efficiency. For example the decode stage may include a number of decode units 90 which may each decode an instruction in parallel, and pass the decoded instructions to the issue queue 10. In a first decode scheme, each of the parallel decode units 90 may be active so that several instructions can be decoded in parallel. In a second decode scheme, one or more of the decode units 90 could be placed in a power saving state (e.g. by power gating or clock gating) so that fewer instructions are decoded per cycle, providing lower performance but greater energy efficiency. This allows different decode schemes to be selected to trade off energy efficiency against performance.

Figure 5:
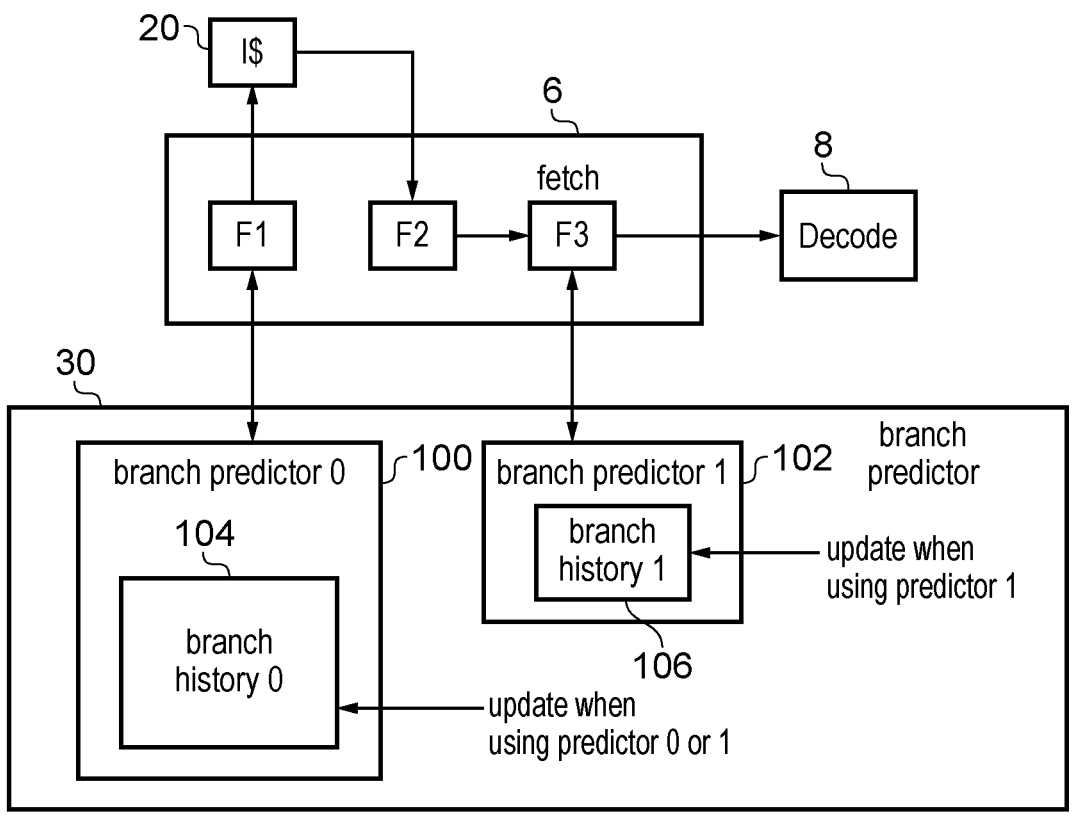
FIG. 5 shows an example of branch prediction circuitry supporting branch prediction schemes with different performance or energy consumption characteristics.

FIG. 5 shows an example in which there are different branch prediction schemes provided by the branch prediction circuitry 30. The branch prediction circuitry 30 may include a first branch predictor 100 which may provide greater performance but consumes more energy and a second branch predictor 102 which provides reduced performance but is more energy efficient.

For example the first branch predictor 100 may have a branch history table 104 which comprises more history data than a branch history table 106 in the second branch predictor. For instance in the branch history table 104 of the first branch predictor 100, there may be a greater number of past branches tracked, or branch prediction confidence may be tracked with more precise counters having a greater number of bits. Branch predictions made by the first branch predictor 100 may be more likely to be correct since they consider more information, but there may be a greater overhead in accessing the larger branch history table 104 and updating the branch history table 104 based on the outcome of the result branches. On the other hand, the second branch history table 106 may be more energy efficient to access and update.

Another way in which the two branch predictors 100, 102 may differ may be in terms of the point of the pipeline at which the branch predictions are initiated. For example, as shown in FIG. 5 the fetch stage 6 may include a number of fetch stages F1, F2, F3. For example, at fetch stage F1 a request may be sent to the instruction cache 20 to request fetching of the next instruction. The fetched instruction may be received at the second fetch stage F2. The third fetch stage F3 may then pass the fetched instruction to the decode stage 8. Other operations could also be performed at some of these fetch stages or further fetch stages may be provided in some examples.

The third fetch stage F3 may identify whether the fetched instruction is a branch instruction, and if so, may initiate a branch prediction using the second branch predictor 102. In this way, the energy cost of making branch predictions can be reduced because branch predictions are only made for instructions identified to be branch instructions and are not made for other types of instructions. On the other hand, when the first branch predictor 100 is used then a branch prediction may be initiated at the first fetch stage F1 before it is known whether the instruction being fetched is actually a branch instruction or not. In this case branch predictions may be initiated for all instructions regardless of whether they are actually a branch and while this may have a greater energy cost because the branch history buffer 104 is looked up more frequently, it can improve performance because the result of the branch prediction would be available earlier and so instructions following the branch can be fetched earlier which can help to improve instruction throughput. Hence, whether the early predictor 100 or the later predictor 102 is used can be selected depending on whether it is preferable to increase performance or an energy efficiency.

While the first branch predictor 100 is used, the branch history data in the branch history table 104 may be updated based on the outcome of resolve branches. For example, a branch prediction confidence counter can be adjusted to increase confidence if a branch prediction was correct and reduce confidence (and change the prediction if necessary) if the branch prediction was incorrect. Any known scheme may be used for updating branch history data. While using the first branch predictor 100 it is not necessary to update the branch history table 106 of the second branch predictor 102.

On the other hand, when using the second branch predictor 102, while resolved branches can be used to update the second branch history table 106, if the first branch history table 104 is not updated then when branch prediction later switches back to the first branch predictor 100, the branch history table 104 will be cold and it may take some time for the accuracy of branch predictions to increase while the branch history table 104 is being warmed up based on the outcomes of resolved branches. This can impact on the performance achieved using the first branch predictor 100 and hence can affect the performance at later stages of the pipeline including the execute stage 12. To improve branch prediction accuracy, the branch predictor 30 may continue to update the first branch history table 104 even while the second branch predictor 102 is being used. Hence the first branch history table 104 can be updated in response to resolved branches regardless of which branch predictor is currently being used. While this may require a little additional energy, in practice it is only when there is a resolved branch (rather than on all fetches or speculative branches) that the branch history table 104 needs to be updated, which may happen relatively infrequently. This additional overhead may justified given the increased performance when subsequently switching back to the first branch predictor 100.

Hence, there are a number of measures which can be taken to adjust the performance or energy efficiency of various parts of the instruction supply circuitry. FIG. 6 illustrates some possible instruction supply schemes that can be selected. In the example A shown in the table of FIG. 6, when the first execute unit 40 is selected then the corresponding schemes in the predecode unit 24, the fetch unit 6, the branch predictor 30 and the decode stage 8 are selected which provide the highest performance. On the other hand, when the second execute unit 42 is selected then the predecode, fetch, branch prediction and decode schemes which provide the greatest energy efficiency can be selected as an example D of FIG. 6. In some systems only examples A and D may be supported. As discussed above, whether the predecode scheme generating more or less predecode information is considered to increase performance or be more energy efficient may depend on the particular implementation.

However, other combinations of the different predecode, fetch, branch prediction or decode schemes may also be provided. For example in examples B and C of FIG. 6 the "wrong" branch prediction scheme may be used by the branch prediction circuitry 30 compared to the currently selected execute unit 40, 42, so that the more energy intensive first branch predictor 100 may be selected in example C while the second execute circuit 42 is executing instructions, or the more energy efficient second branch predictor 102 may be selected in example B of FIG. 6 while the first execute unit 40 executes instructions. This can be useful for handling sets of instructions for which there is a particularly high or low branch prediction success rate. For example, in option B of FIG. 6 the more energy efficient branch predictor 102 could be selected if for a particular set of instructions there is a high misprediction rate for the first branch predictor 100 which prevents significant performance increases and so it can be more efficient to use the second branch predictor 102 even though instructions are being executed on the first execute unit 40.

It will be appreciated that other systems may provide more arbitrary combinations of the different predecode, fetch, branch prediction or decode scheme so that a range of different instruction supply schemes can be selected with different performance or energy efficiency points. Also, while the above examples have shown cases with two execute units and two options for different fetch, decode, branch prediction or predecode schemes, it will be appreciated that three or more schemes could be provided in a similar way with different levels of performance or energy consumption.

Figure 7:
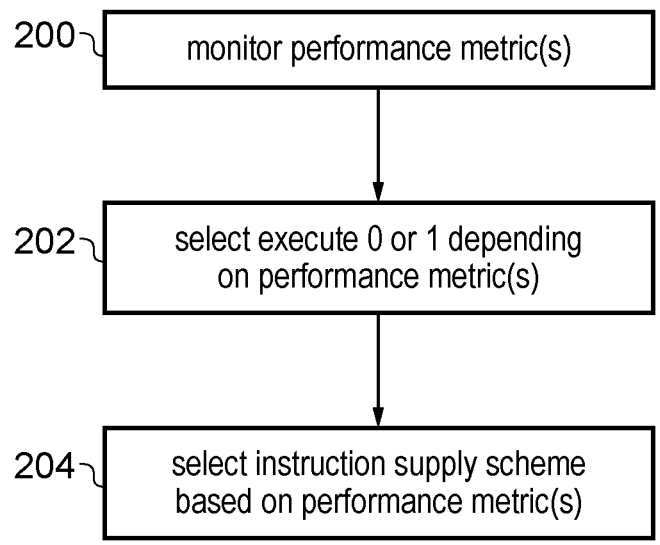
FIG. 7 is a method of selecting which execution circuitry to use and which instruction supply scheme to use.

FIG. 7 shows a method of controlling the operation of the pipeline 4 shown in FIG. 1. At step 200 the control circuitry 50 monitors one or more performance metrics during execution of the instructions. For example the performance metrics could indicate an indication of throughput of instructions achieved using the first execute unit 40. At step 202 the control circuitry selects one of the first and second execute units 40, 42 depending on the performance metrics. For example the first execute unit 40 could be selected if the performance achieved for a given set of instructions is higher than a given threshold while the second execute unit could otherwise. At step 204 the control circuitry 50 also selects which instructions supply scheme is used based on the performance metrics. This can be done as shown in FIG. 6 depending on which of the execute units is used, or based on other information such as the branch prediction success rate.

Figure 8:
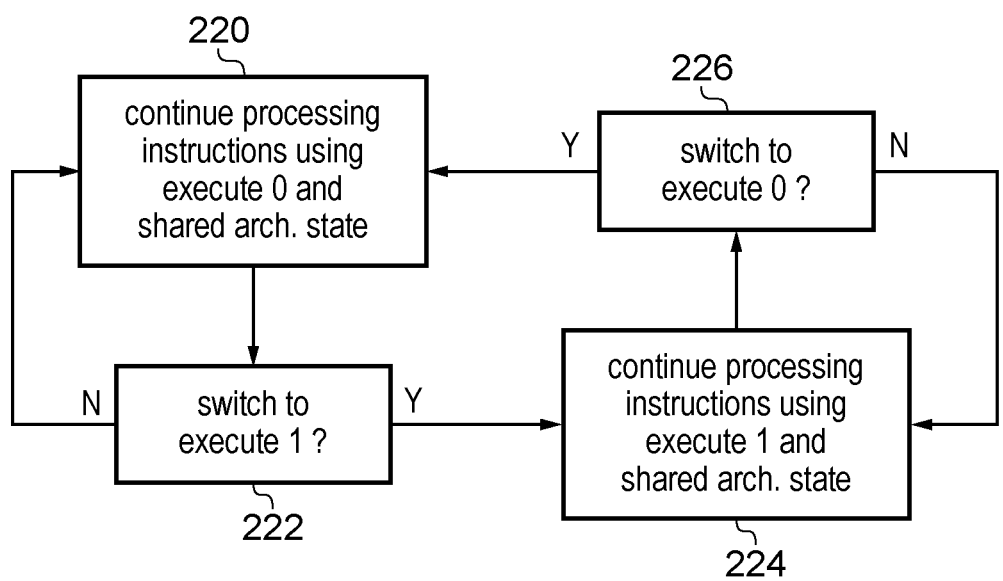
FIG. 8 is a method of processing instructions using first and second execution circuitry which share architectural state.

FIG. 8 shows a method of switching processing between the first and second execute units 40, 42. At step 220 instructions are processed using the first execute unit 40 and the shared architectural state 60. At step 222 the control circuitry 50 determines whether to switch processing to the second execute unit 42. If not then processing continues at step 220 on the first execute unit 40. If execution is to be switched to the second execute unit 42 then the control circuitry 50 controls the issue stage 10 to start issuing instructions to the second execute unit 42 and at step 224 of FIG. 8 processing continues using the second execute unit 42. The second execute unit 42 can simply read the architectural state in the shared storage 60 which was previously set by the first execute unit 40 and continue processing from the point where the first execute unit 40 left off. At step 226 the control circuitry 50 determines whether to switch processing back to the first execute unit 40. If not then the method continues processing instructions using the second execute unit 42 at step 224. If a switch is desired then processing switches back to the execute units 40 and processing continues at step 220 of FIG. 8. Again, the first processing unit 40 can simply continue processing using the shared architectural state 60. Hence, as shown in FIG. 8, there is no need to transfer architectural state 60 when switching between the execute units, including the register file 62.

Figure 9:
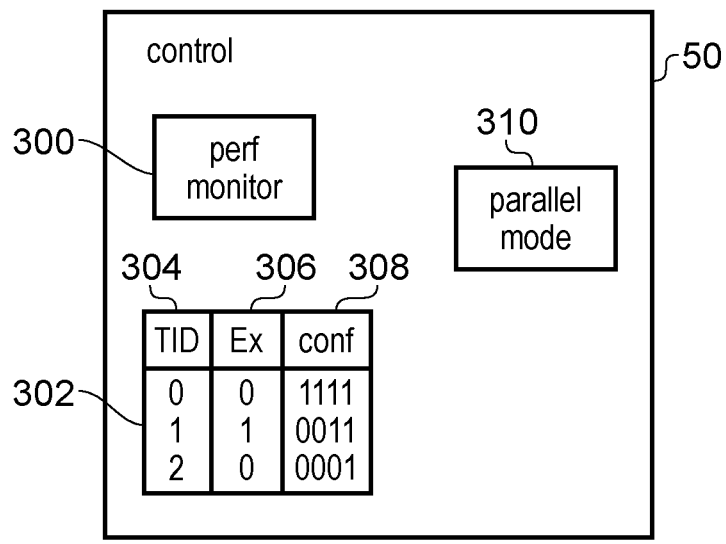
FIG. 9 shows an example of control circuitry for controlling which execution circuitry is used.

FIG. 9 shows an example of the control circuitry 50 in more detail. The control circuitry may have performance monitoring circuitry 300 for monitoring performance metrics during processing of the instructions as discussed above. The control circuitry 50 may also have a thread table 302 for classifying whether threads of the instructions to be executed should be executed on the first execute unit 40 or the second execute unit 42. Instructions fetched by the fetch data 6 may be associated with a thread identifier (TID) identifying which thread the instructions belong to. For example each thread may correspond to a different piece of code to be executed, or to a different instance of a common piece of code which is executed using different input data. The performance monitoring circuitry 300 may monitor performance metrics separately for each thread so that a prediction of which execute unit 40, 42 is preferred can be made on a per-thread basis. The table 302 includes a number of entries each specifying a thread ID 304 of a corresponding thread, an indication 306 of the execute unit 40, 42 to use for that thread, and a confidence indication 308 indicating a level of confidence in the prediction of the execution unit for that thread. If having made a prediction, the performance metrics monitored by the monitoring circuitry 300 continue to indicate that the same execute unit is still preferred, then the confidence level 308 for the corresponding thread can be increased, while if the performance metric indicates that the other execute unit is more preferred then the confidence level can be decreased. When the confidence level crosses a threshold then this can trigger switching of the prediction indicated by the execute unit field 306. When instructions are fetched from a given thread, the control circuitry 50 can control the issue stage 10 to issue the instructions to the appropriate execute unit 40, 42 indicated by the indication 306 in the entry for the corresponding thread. The indication 306 could also influence which instruction supply scheme is used.

While FIG. 9 shows an example where the execute unit indication 306 and the confidence indication 308 are provided separately, in other examples a single value could provide both pieces of information with values less than a certain threshold indicating that one execution unit is preferred with varying levels of confidence, and values above the threshold indicating that the other execution unit is preferred with varying levels of confidence.

The control circuitry 50 may have a mode indicating parameter 310 which indicates whether a parallel processing mode is enabled or not. The parameter could be provided in a dedicated register in the control circuitry 50, or could be stored in the status registers 68 of the shared architectural state 60. When a parallel processing mode is enabled, then it is possible to process one of the threads categorised for execution on the first processing unit 40 in parallel with one of the threads categorised for processing on the second processor unit 42. On the other hand, when the parallel mode is not enabled, then only one of the execute units 40, 42 may be active at a time and a thread categorised for processing on the inactive execute unit 40, 42 must wait until processing is switched to that execute unit before being executed.

In order to support the parallel execution mode, the shared architectural state 60 may have multiple access ports so that it can be read or written to in parallel by each execute unit 40, 42. The shared architectural state storage may have some circuitry to manage contention between the two execute units 40, 42. For example, the architectural state storage circuitry 60 may partition some elements of the architectural state (such as the register file 62) so that some areas may be reserved for the first execute unit 40 and others reserved for the second execute unit 42 while the parallel mode is enabled. Hence, selecting the parallel mode may in some cases impact slightly on the performance of the first execute unit 40 since fewer registers may be available, but the overall performance may be increased because instructions can be processed on both units in parallel. For example, the pipeline may include register renaming circuitry for renaming particular registers of the register file 62 and this may control allocating particular registers to the first and second units 40, 42 when the parallel mode is enabled.

Figure 10:
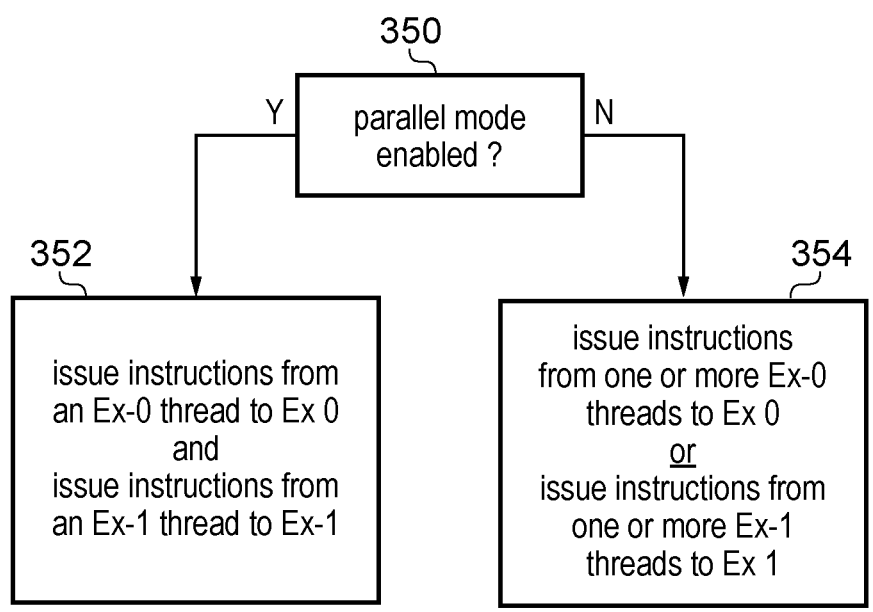
FIG. 10 is a method showing an example of providing a parallel processing mode where first and second execution circuitry process instructions in parallel.

FIG. 10 is a method showing use of the parallel mode. At step 350 the control circuitry 50 determines whether the mode indication 310 indicates that the parallel mode is enabled. If so then at step 352 the control circuitry 50 controls the issue stage 10 to issue to the first execute unit 40 instructions from a thread indicated in the table 302 as suitable for first execute unit 40. Also the issue stage 10 is controlled to issue to the second execute unit 42 instructions from a thread categorised as suitable for that execution unit. On the other hand, when the parallel mode is not enabled, then following step 350 at step 354 instructions are issued to only one of the execute units. At step 354, it is still possible to issue instructions from multiple threads as long as each of these threads are classified to be executed on the same one of the two execute units 40, 42.

Figure 11:
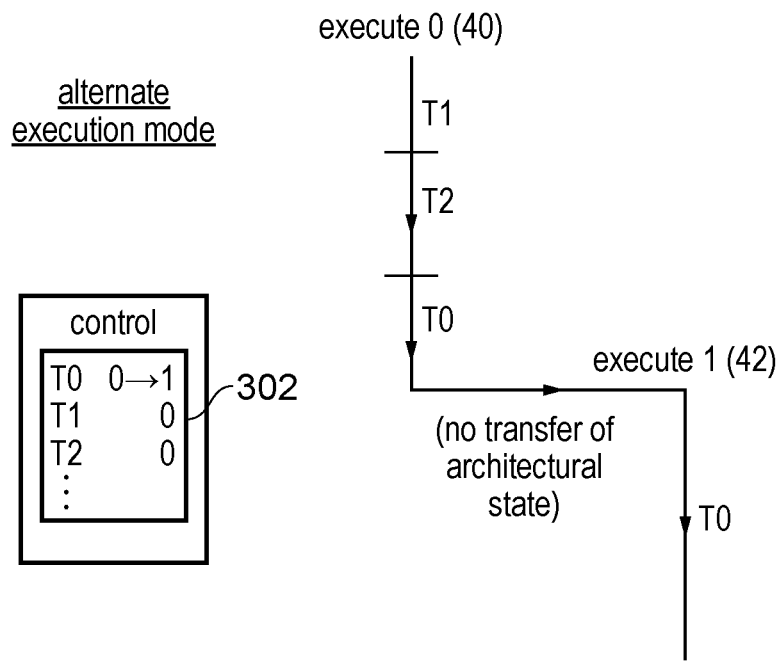
FIG. 11 shows an example of an alternate execution mode in which one of the first and second execution circuitry processes the instructions.
Figure 12:
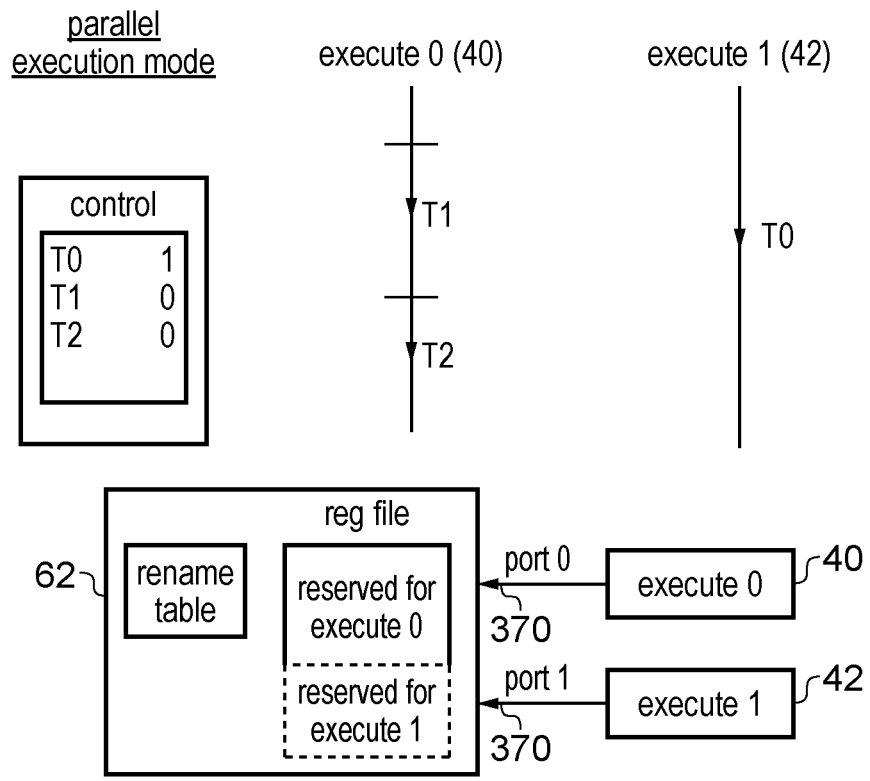
FIG. 12 shows an example of a parallel execution mode in which both execution circuits may process instructions simultaneously.

FIGS. 11 and 12 show examples of the alternate execution mode and parallel execution mode. As shown in FIG. 11, when the alternate execute mode is selected then threads are executed on one of the execute units at a time. In this example, threads T1 and T2 are executed on the first execution unit 40. During processing of another thread T0 on the first execution unit 40, the control circuitry 50 determines from the performance metrics that it would be preferable to migrate thread T0 to the more energy efficient second execute unit 42. The control circuitry updates the prediction in the table 302 and controls the issue stage 10 to start issuing instructions to the second execute unit 42. No transfer of architectural state is required because of the sharing of the architectural state storage 60. Processing continues from the point at which it was left off on the first execute unit 40.

On the other hand, as shown in FIG. 12 during the parallel execution mode, instructions from threads T1, T2 can be executed on the first execution unit 40 in parallel with a thread T0 which has been classified for execution on the second execute unit 42. This allows greater performance by processing multiple threads in parallel, but with a lower energy overhead than if the higher performance logic 40 had simply been expanded to support a greater number of threads. As shown in the lower part of FIG. 12, the register file 62 may be partitioned to reserve certain parts for each execute unit and multiple access ports 370 may be provided to allow parallel access to the registers from the two execute units 40, 42.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes and modifications can be effected therein by one skilled in the art without departing from the appended claims.

The invention claimed is:

1. An apparatus comprising:
   a processing pipeline comprising, within the same processing pipeline:
   first and second execution circuitry to execute instructions, wherein the first and second execution circuitry have different performance or energy consumption characteristics;
   at least one shared pipeline stage used both for instructions executed by the first execution circuitry and for instructions executed by the second execution circuitry; and
   branch prediction circuitry to predict an outcome of branch instructions;
   wherein:
   the branch prediction circuitry is configured to support first and second branch prediction schemes with different performance or energy consumption characteristics;
   in the first branch prediction scheme, the branch prediction circuitry is configured to generate a branch prediction based on a first set of branch history data, and in the second branch prediction scheme the branch prediction circuitry is configured to generate a branch prediction based on a second set of branch history data;
   while using the first branch prediction scheme, the branch prediction circuitry is configured, in response to outcomes of resolved branch instructions, to update the first set of branch history data without updating the second set of branch history data;
   while using the second branch prediction scheme, the branch prediction circuitry is configured, in response to outcomes of resolved branch instructions, to update both the first set of branch history data and the second set of branch history data; and
   the branch prediction circuitry is configured to support the first and second branch prediction schemes both usable within the same processing pipeline,
   wherein in the first branch prediction scheme, the branch prediction circuitry is configured to initiate a branch prediction at an earlier stage of the processing pipeline than in the second branch prediction scheme.

2. The apparatus according to claim 1, wherein in the first branch prediction scheme, the branch prediction circuitry is configured to initiate a branch prediction for a first selected instruction before the first selected instruction is identified as a branch instruction; and in the second branch prediction scheme, the branch prediction circuitry is configured to initiate the branch prediction for a second selected instruction after the second selected instruction has been identified as a branch instruction.

3. The apparatus according to claim 1, wherein the first set of branch history data comprises a greater amount of branch history data than the second set of branch history data.

4. The apparatus according to claim 1, comprising control circuitry configured to select, for a given set of instructions, whether the branch prediction circuitry is to use the first instruction branch prediction scheme or the second branch prediction scheme.

5. The apparatus according to claim 4, wherein for theft given set of instructions, the second execution circuitry is configured to consume less energy when executing the given set of instructions than the first execution circuitry;
when using the second branch prediction scheme, the branch prediction circuitry is configured to consume less energy than when using the first branch prediction scheme; and
the control circuitry is configured to select the first branch prediction scheme for instructions to be executed by the first execution circuitry and to select the second branch prediction scheme for instructions to be executed by the second execution circuitry.

6. The apparatus according to claim 1, wherein for a given set of instructions, the second execution circuitry is configured to consume less energy when executing the given set of instructions than the first execution circuitry;
when using the second branch prediction scheme, the branch prediction circuitry is configured to consume less energy than when using the first branch prediction scheme; and
the apparatus comprises control circuitry to select which of the first and second branch prediction schemes to use for the given set of instructions;
wherein the control circuitry is configured to permit the first branch prediction scheme to be selected for instructions to be executed by the second execution circuitry or permit the second branch prediction scheme to be selected for instructions to be executed by the first execution circuitry.

7. The apparatus according to claim 1, comprising at least one shared pipeline element used both for instructions executed by the first execution circuitry and for instructions executed by the second execution circuitry,
wherein the at least one shared pipeline element comprises at least one of:
at least one instruction cache to store instructions to be fetched for processing;
fetch circuitry configured to fetch instructions for processing;
decode circuitry configured to decode instructions;
shared registers to store operands to be processed by the first execution circuitry and the second execution circuitry;
writeback circuitry to write data to registers in response to instructions executed by the first execution circuitry and the second execution circuitry;
a data cache to store data accessible in response to instructions executed by the first execution circuitry and the second execution circuitry;
status registers to store status information indicative of a status of the first execution circuitry or the second execution circuitry; and
configuration registers to store configuration information for configuring operation of the first execution circuitry or the second execution circuitry.

8. The apparatus according to claim 1, comprising at least one shared pipeline element used both for instructions executed by the first execution circuitry and for instructions executed by the second execution circuitry, and in which the shared pipeline element comprises shared program counter storage circuitry to store a shared program counter.

9. A method comprising:
selecting one of first and second execution circuitry of a processing pipeline for executing a group of instructions, the first and second execution circuitry having different performance or energy consumption characteristics, wherein the processing pipeline comprises, within the same processing pipeline, the first and second execution circuitry, branch prediction circuitry, and at least one shared pipeline stage used both for instructions executed by the first execution circuitry and for instructions executed by the second execution circuitry; and
selecting one of first and second branch prediction schemes for predicting an outcome of branch instructions using the branch prediction circuitry, wherein the first and second branch prediction schemes have different performance or energy consumption characteristics;
wherein:
in the first branch prediction scheme, a first branch prediction is generated based on a first set of branch history data, and in the second branch prediction scheme, a second branch prediction is generated based on a second set of branch history data;
in the first branch prediction scheme, in response to outcomes of resolved branch instructions, the first set of branch history data is updated without updating the second set of branch history data;
in the second branch prediction scheme, in response to outcomes of resolved branch instructions, both the first set of branch history data and the second set of branch history data are updated;
the branch prediction circuitry supports the first and second branch prediction schemes both usable within the same processing pipeline; and
in the first branch prediction scheme, the branch prediction circuitry initiates a branch prediction at an earlier stage of the processing pipeline than in the second branch prediction scheme.

* * * * *